A. F. G. C. P. J. VON GROELING.
APPARATUS FOR HEATING LIQUID HYDROCARBONS IN DISTILLING AND OTHER PROCESSES.
APPLICATION FILED DEC. 21, 1918.
1,378,066.
Patented May 17, 1921.
2 SHEETS—SHEET 2.
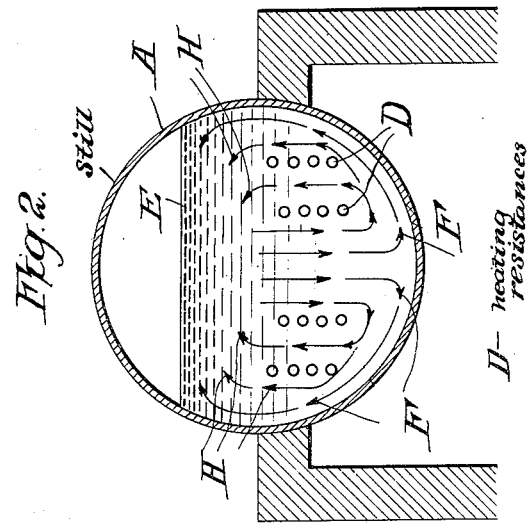
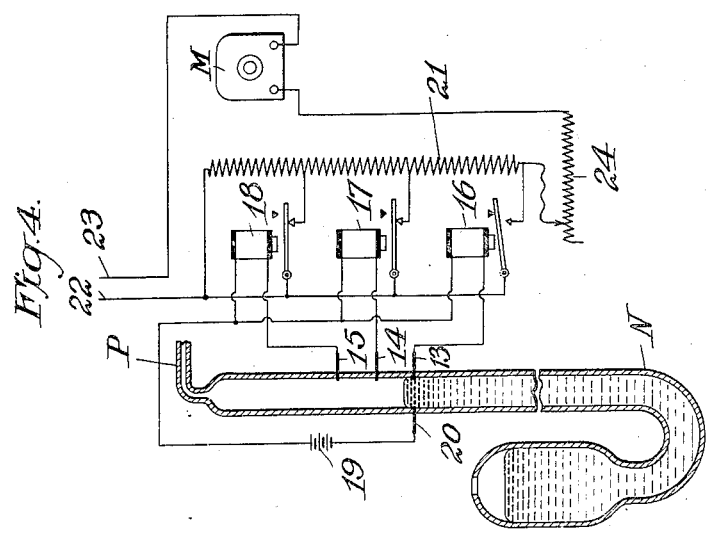

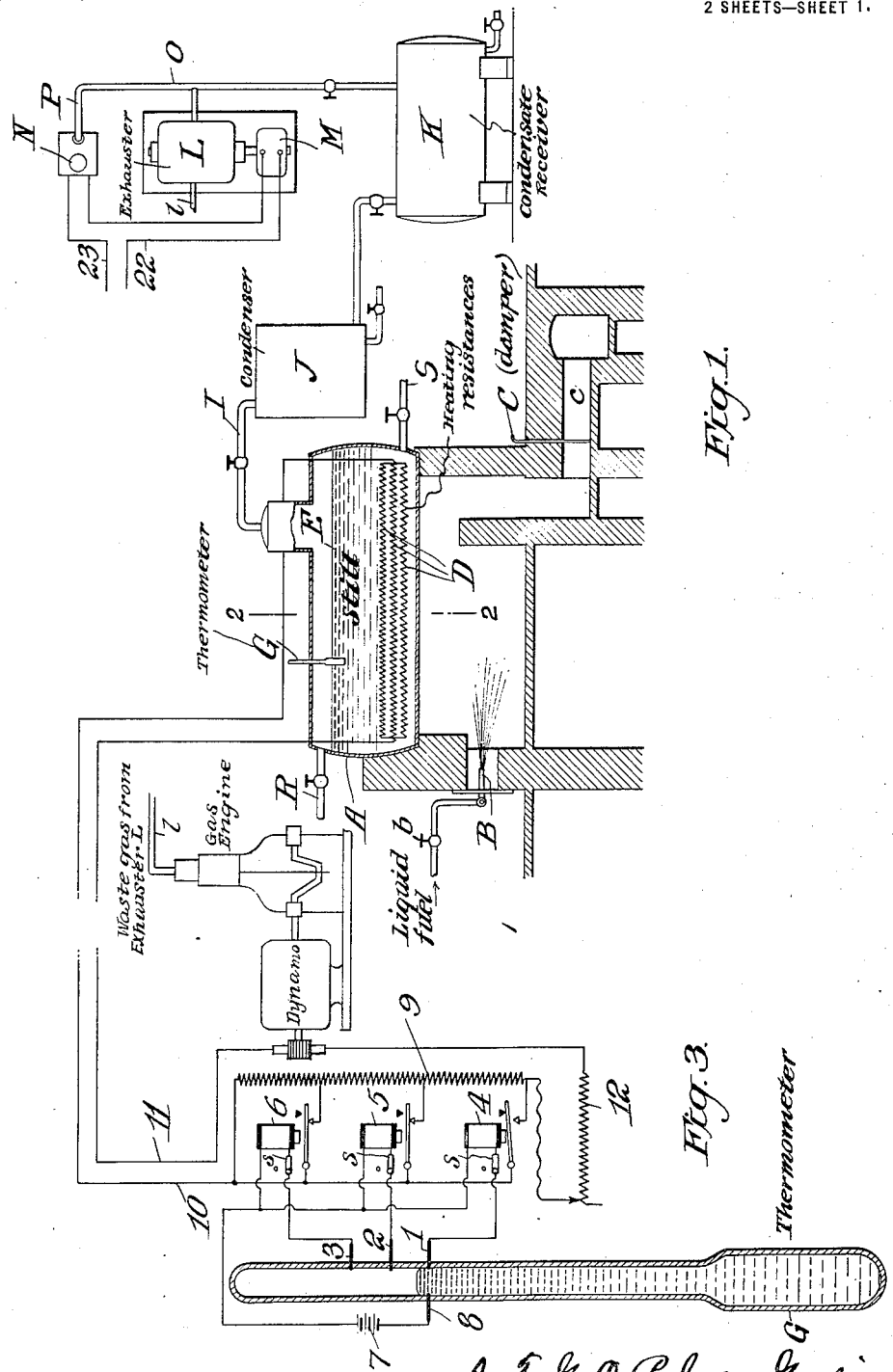

UNITED STATES PATENT OFFICE.

ALBRECHT FRIEDRICH GEORG CARL PAUL JOSEF von GROELING, OF NEW YORK, N. Y., ASSIGNOR TO NATIONAL REFINING CORPORATION, INC., OF NEW YORK, N. Y., A CORPORATION OF NEW YORK.

APPARATUS FOR HEATING LIQUID HYDROCARBONS IN DISTILLING AND OTHER PROCESSES.

1,378,066.  Specification of Letters Patent.  Patented May 17, 1921.

Application filed December 21, 1918. Serial No. 267,766.

*To all whom it may concern:*

Be it known that I, ALBRECHT FRIEDRICH GEORG CARL PAUL JOSEF VON GROELING, a citizen of Austria, residing at New York, in the county and State of New York, have invented certain new and useful Improvements in Apparatus for Heating Liquid Hydrocarbons in Distilling and other Processes, of which the following is a full, clear, and exact description.

The process of distilling petroleum has undergone notable changes during the past decade in the direction of greater economy of operation and cleaner separation of products but still possesses certain drawbacks involving, for example, over expenditure of fuel, loss by unnecessary and premature evaporation, and unwanted alteration of products by ill-treatment of the compounds of which petroleum consists.

It is a well known fact that by different ways of treating any one given crude oil different results can be obtained, results different in quality, and different in their relative quantities. One of the main objects of several of my devices for distilling petroleum and its derivatives was to bring about and govern the conditions underlying those sometimes very unexpected changes, and the present invention is a result of my experience along these lines.

One of the principal objections to the methods now in use is the fact that petroleum is treated as a homogeneous liquid, like water, for example. In distilling water the conditions for vaporization are always the same, and nothing but water can be evaporated, whatever the temperature may be. Only the quantity evaporated changes, not the quality or nature of the vapor or condensate produced. On the other hand it is very different with petroleum, which is composed of various substances the conditions of evaporation of which are different and consequently, also, the conditions of condensation. Indeed the difference is even greater, for the conditions under which evaporation and condensation take place influence also the formation of compounds and hence affect the nature and quality of the distillates. To complicate the problem still more evaporation at one temperature does not mean that only the product wanted is vaporized, inasmuch as in vaporizing the product wanted neighboring fractions condense at the first opportunity and fall back into the liquid already partly altered in chemical structure. This fact has been made use of since the beginning of the art, and distilling systems are now employed which permit the too early fractions to condense and fall back before they reach the external means of condensation. Oil distillers regard this as an advantageous condition, as necessary and favorable to the whole process of distillation, and to further the quick recondensation, means for the purpose have been provided in which cooling surfaces are employed, acted on by air as a cooling agent. Of course this measure effects a purification of the stuff evaporated, in the direction of unifying it, so to speak; but at the same time it means a waste of heat, and, what is worse, the quality of later products, especially the last portion of the run, is impaired. As long as the crude oil treated is of such quality that it yields sufficiently large quantities of the desirable liquids the disadvantages of the procedure described are disregarded.

The chief object of my present invention is therefore to provide means and method by which the distillation process can be adapted in every case to the intrinsic qualities of the material to be treated. In the processes now commonly employed the results depend largely upon the attention, skill and good sense of the operator. Moreover, the means at his disposal for regulation or varying the distilling conditions, especially the temperatures, are primative and crude. For instance, the regulation of temperature is effected by varying the fire, either by putting more or less fuel on the grate, or by opening more or less the valve controlling the supply of liquid or gaseous fuel, or by throttling or opening the flues or passages through which the gaseous products of combustion escape, etc. Such expedients are effective ultimately, but they are too slow, that is, the desired change of temperature does not follow promptly enough, and there can never be any certainty that such regulation does not overdo in one direction or another. Another factor of importance is the circulation in the still. This circulation installs itself automatically, and depends upon the intensity of the heating and upon the form of the heating surface. Moreover, it is slow and uncontrolled. One of the consequences of slowness of circulation is a relatively slow equalization of the distilling temperature, thus conducing to undesired changes in the distillation products. A proper stimulation of the circulation would be the means to produce more uniform distillates at a given moment and a more economical use of the heat employed. But not only a stimulation of the circulation is desirable, a means of regulating it between certain limits is also necessary. For not only an understimulation is detrimental but an overstimulation as well. In the latter case mechanical entraining of fractions not yet at their boiling point would destroy the advantages gained by a proper stimulation. To be able to bring about sudden changes in the circulation is another important factor for success as by such means conditions may be quickly altered before they have time to inflict damage. Another object of my invention is therefore to provide means for regulation or controlling the circulation.

The foregoing objects are attained in a most effective way by my invention, which involves the provision of electrical heating means, preferably employed conjointly with other heating means as for example a fire. Only by electrical heating is it possible to obtain the desired results discussed above in an ideal way. It should be noted however that the total heat introduced by the electrical heating is by no means the important factor. Its ideal adaptability and the suddenness of its effects are here as in many other cases the main factors which guarantee electrical heating success in distilling operations, and its place therein henceforth. The electrical heating means may consist of one or more resistances immersed in the oil or other hydrocarbon liquid, and the regulation of the heat thus contributed can be effected by the aid of a thermometer or thermostat in a variety of ways, as for example by varying the speed of the generator from which the heating current is supplied, thereby varying the heating current, or by opening and closing the heating current, or, when alternating current is employed, by varying the inductance of the heating current, or by varying the effective number of turns in the armature of the generator, etc.

I review the various kinds of distillations wherein electrical heating would be of great avail:

1. *Continuous distillation.*

Herein the task of electrical regulation though very important is relatively simple. Once the conditions of heating and the way of fueling the various units is established there is only needed a device to keep the heating conditions steady. This regulation may be automatic by means of a temperature-measuring device which will increase or decrease the heating current as the temperature falls or rises, thus establishing a nearly uniform temperature in the still. Nowadays the regulation is based upon the specific gravity of the distillate as determined at the receiving box. As they vary in specific gravity the fire or steam is regulated accordingly. This regulation as not effected by hand however is slow and allows lots of stuff to go over which is not wanted or, on the other hand, to fall back into the still, there to be re-distilled in a partly transformed condition.

2. *Discontinuous distillation.*

This problem is more intricate as changes in temperature naturally take place as the distillation progresses, and the undesired variations in temperature are more frequent as a consequence of the unsteady heating. The regulation of the strength of the heating current is therefore not easily effected by automatic means but rests with the still man who according to the fluctuations of the thermometer increases or decreases the heating current according to the temperature he wants to keep.

Electrical heating is of special value in a distilling plant in which the distillation is effected under a high vacuum, as in my Patent No. 1,327,184, issued January 6, 1920, on an application filed April 22, 1916. In such a plant the distilling temperatures are relatively very low, and hence temperature variations have great effect on the quality of the products and on their relative quantities. But with electrical heating as herein described, the injurious temperature variations can be practically eliminated and steady temperatures maintained.

3. *Cracking.*

In this process of converting heavier hydrocarbons into lighter ones it is well known how great a part the temperature generally plays, not only the temperature however but also its maintenance inside very narrow limits. With the ordinary methods of heating this is a difficult task especially at the starting of a new installation or of a new device, wherein the final temperature most favorable for the treatment is not yet determined.

4. *Gasolene rectification.*

Here also the slow increase of temperature step by step is of paramount importance. Rectification of gasolene is an expensive process only because this slow ascent is generally impossible and therefore necessitates the intrinsic redistillation of the same liquid over and over again. This would to a great extent be avoided by electrical heating, viz. regulation.

That electrical heating, viz. regulation, can be made economical there is no doubt. It can be easily shown by a simple theoretical consideration. With the use of gaseous or liquid fuel in an internal combustion engine there may be obtained a thermal efficiency of from 27 to 34% and if the engine is coupled to a generator more than 85% of this (or 23 to 29% of the heat-energy of the fuel) is converted into electrical energy. The exhaust gases contain from 68 to 60% of the total heat energy of the gas and of this about 60% (or 41 to 36% of the original heat energy of the gas) may be utilized by passing it through heating coils in preheaters or feed water heaters. This gives a total of about 65% of the heating value of the gas actually utilized for heating purposes. With the ordinary method of heating the stills rarely as much as one-half of this heat efficiency is realized. This is due not only to the imperfections of fire heating but also to the unavoidable redistillations mentioned heretofore, not even taking into account the succeeding redistillations necessary for the purification of the promiscuous products.

The electrical heating to the exclusion of other means would therefore be advantageous in all cases except for the fact that in large plants the power units would have to be very large. Hence in such plants electricity would be used chiefly as a means of control. In smaller plants, however, the use of electricity alone is in most if not all cases advisable.

A convenient and effective form of the invention is illustrated in the accompanying drawing, in which—

Figure 1 shows the system diagrammatically, the still and heating furnace being in section.

Fig. 2 is a cross section of the still, also diagrammatic in character, on line 2—2 of Fig. 1.

Fig. 3 illustrates diagrammatically a simple means for automatically regulating the distilling temperature.

Fig. 4 is a diagram showing a device for automatic regulation of the vacuum.

A designates a still or other closed vessel with external heating, in the present instance by means of a furnace fired with liquid fuel injected at B and regulated by means of a valve, as $b$, or by opening, more or less, the damper C in the outlet flue $c$ for the gaseous products of combustion. Other methods of heating, for example steam-heating by means of steam pipes or coils arranged preferably in the still, are to be regarded as equivalents of the furnace method. D designates an electrical heating device consisting, in the present embodiment, of a plurality of resistance units connected in parallel and arranged so as to be submerged by the oil E in the still when distillation is going on.

The circulation in the still depends both on the external heating (by the fire) and on the internal heating by the electrical resistance devices. In Fig. 2 the arrows marked F indicate in a general way the circulation produced by the outside heating and the arrows H the circulation produced by the electrical heating from the devices D arranged as shown in the figure. It will be apparent at once that the electrical heating stimulates the circulation and that this circulation is determined to a considerable degree by the disposition and spacing of the heating resistance D. Thus in Fig. 2 the resistances are nearer to the sides of the still than to the center. Hence, assuming that the external heat is applied practically uniformly over the undersurface of the still, it will be seen that the still contents will be hotter at the sides of the still than at the center thereof. Consequently the convection currents will, in general, flow downwardly at the center and upwardly at the sides, as indicated by the arrows.

Fig. 3 shows the means provided for regulating the heat (generated by the flow of current through the device D) by controlling the generator which supplies the heating current. For this purpose a thermometer G is employed, which is at least partly immersed in the oil E as indicated in Fig. 1. In the wall of the thermometer tube a series of contacts are provided, indicated at 1, 2, 3, connected to the relay magnets 4, 5, 6 respectively; the other terminals of the magnets being connected to a common return wire connected to one pole of a source of current the other pole of which is connected to a common return contact 8 in the thermometer wall. The contacts for the relay armatures are connected to taps brought out from the resistance 9, while the armatures themselves are connected (in parallel with each other) to the wire 10. Assuming that the temperature of the liquid E, Fig. 1, is sufficient to bring the mercury up to contact 1, it will be seen that the circuit of magnet 4 is completed and the magnet energized, which thereupon raises its armature and thus puts resistance into the external circuit of the heating device D, said circuit consisting of wires 10 and 11 and the generator I. The current to the device D is therefore reduced, and accordingly less heating is contributed by the electrical system. If the mercury climbs to contact 2 magnet 5 is energized and more resistance is cut in, and so on, if necessary, until so little current flows through the device D that the temperature ceases to rise. Should the temperature decrease the reverse operation takes place; resistance is cut out until the mercury ceases to fall.

Other conditions being equal, the closeness of regulation of the distilling temperature depends upon the number of divisions of the resistance 9 and the number and spacing of the contacts to which the relay magnets are individually connected. In general the external heating of the still should be regulated so as to furnish the greater part of the heat required. The additional heat needed will then be supplied electrically and will be automatically increased if the external heating decreases in intensity and will be decreased if the external heating increases in intensity. Experience has shown that in this way the distilling temperature can be kept constant within narrow limits notwithstanding wide variation of the heat supplied externally.

In addition to the automatic control, the upper limit of the temperature can be controlled by hand by means of the variable resistance indicated diagrammatically at 12. With the manual resistance in the positions shown, the temperature maintained will be relatively low, since even with all of the automatic resistance 9 cut out the current through D cannot rise above that determined by resistance 12. By decreasing the amount of resistance 12 in the circuit the temperature will rise, since then the cutting in of resistance 9 by the thermometer leaves the current greater than when more of resistance 12 is in circuit. In this way the temperature can be gradually increased or decreased and can be maintained at any point determined by the position of the hand-controlled resistance. In the foregoing it is assumed that direct current is used. If alternating current is used, of course the resistances 9 and 12 are replaced by inductances.

Of course danger of fire or explosions caused by sparking at the armature and resistance contacts should be effectually guarded against, as by suitably inclosing the contacts in casings, not shown. The heat produced by the flow of current through the controlling resistances 9 and 12 can be utilized if desired, as for example by placing them in crude oil preheaters or in feed water tanks.

The vapors produced in the still A escape by way of a pipe I and pass to a condenser J or series of condensers. From the condenser the condensate is discharged into a receiver K. For vacuum working, the system may be provided with an exhauster or pump L, connected, for example, to the receiver K. The advantages of my invention are particularly important when a high vacuum is used, with the pressure as low as, say, 50 millimeters of mercury, or even less if posible. Preferably the exhauster is driven by an electric motor M. The speed of the latter, and hence the operation of the exhauster and the degree of vacuum produced thereby is controlled by the device illustrated in Fig. 4, comprising a U-shaped mercurial barometer or manometer N having a short leg which is open to the atmosphere and a long leg which is connected to the vacuum pipe O by a pipe P, Fig. 1. Sealed in the longer leg is a series of platinum contacts, of any desired number depending upon how closely it is desired to regulate the vacuum. Three such contacts are shown, designated by 13, 14, 15, connected to relay magnets 16, 17, 18, respectively, which latter are also connected through a battery 19 to a common return contact 20 in the wall of the barometer. The contacts for the relay armatures are connected to taps brought out from a resistance 21 connected in the circuit by means of wires 22, 23, while the armatures themselves are connected in parallel directly to the wire 22. Assuming that the vacuum is sufficient to bring the mercury up to the contact 13, it will be seen that the circuit of magnet 16 is completed and the magnet energized, thereby raising its armature and cutting resistance (or inductance, as the case may be) into the circuit of the driving motor M. If, now, the vacuum is insufficient to hold the mercury at that point the column will fall, and when contact 13 is uncovered the magnet is deënergized, whereupon the resistance is cut out and the motor speeds up. On the other hand, if the mercury continues to rise it will reach contact 14 and thus cut more resistance into the circuit, causing the motor to slow down still more. The motor can also be controlled by the manually operated resistance 24 to vary the vacuum, like the manual control of temperature illustrated in Fig. 3.

Experience has demonstrated that with automatic means of the kind described very close regulation of the vacuum is secured with practically no attention on the part of the operator.

For continuous working the crude oil or other material is continuously supplied in regulated amount through the valved inlet pipe R, Fig. 1, and the residue is continuously discharged through the valved outlet pipe S. The heating conditions having been determined, the regulation of temperature is effected automatically, as explained. In discontinuous working, the temperature must be changed (in general increasing) as the distillation proceeds. For such purpose the resistance 9, Fig. 3, may be dispensed with, as for example by disconnecting the contacts 1, 2, 3 from the magnets. For this purpose the conductors leading from contacts 1, 2, 3 are provided with switches s, which can be opened to disconnect the magnets 4, 5, 6 from the contacts referred to. The operator then keeps watch on the thermometer, which may be provided with a suitable scale of degrees, not shown, and controls the temperature by manipulation of the resistance 12. In this way an attentive operator can vary the temperature at any desired rate, or keep it substantially constant at any point for as long as may be necessary.

From the exhauster L the uncondensed gases or vapors are delivered through pipe *l*. These waste gases, being highly inflammable, can be utilized for producing the current employed in the electrical heating. For this purpose the gas may be supplied to an internal combustion engine T which drives the dynamo I.

It is to be understood that the invention is not limited to the specific embodiment herein illustrated and described, but can be embodied in other forms without departure from its spirit.

I claim:

1. In an apparatus for the purpose described, a still for liquid hydrocarbon, an electrical heating-resistance in the still, means for supplying current to the heating-resistance, an automatic means, responsive to the temperature in the still, for controlling the flow of current in the heating-resistance to maintain a desired temperature in the still.

2. In an apparatus for the purpose described, a still for liquid hydrocarbon, an electrical heating-resistance in the still, means in circuit with said heating-resistance to supply current thereto, and means responsive to variations of temperature in said still for cutting resistance into and out of said circuit whereby to maintain a substantially constant and predetermined temperature in said still.

3. In an apparatus for the purpose described, a still for liquid hydrocarbon, an electrical heating-resistance in the still, means in circuit with the heating-resistance to supply current thereto, means responsive to temperature changes in said still for controlling the supply of current to the heating resistance, and manually actuated means for controlling the current supply.

4. In an apparatus for the purpose described, a still for liquid hydrocarbon, external means for heating the contents of the still, electrical means for supplying heat to the contents of the still, and means to control the electrical heating means independently of the other heating means whereby the temperature produced by both sources of heat conjointly may be maintained substantially constant or varied as desired.

5. In an apparatus for the purpose described, a still for liquid hydrocarbon, external means for heating the contents of the still, electrical means for heating the contents of the still, and automatic means responsive to the temperature produced in the contents of the still by both sources of heat conjointly, to regulate the electrical means independently of the other heating means as said temperature varies whereby the temperature can be maintained substantially constant.

6. In an apparatus for the purpose described, a still for liquid hydrocarbon, a plurality of sources of heat for heating the contents of the still, one of said sources being electrical, and means for controlling the electrical source of heat whereby variations in the heat otherwise supplied can be compensated for by varying the heat supplied by the said electrical source.

7. In an apparatus for the purpose described, a still for liquid hydrocarbon, a plurality of sources of heat for heating the contents of the still, one of said sources being electrical, means for controlling another of said sources to maintain a more or less constant of heat, and automatic means responsive to the temperature produced in the contents of the vessel by said plurality of sources conjointly, to vary the heat supplied by the electrical means and thereby maintain the contents of the vessel at a substantially constant temperature.

8. In an apparatus for treating liquid hydrocarbon, a still for the liquid hydrocarbon, an electrical heating resistance therein, a prime mover for utilizing waste gas from the apparatus, an electrical generator driven by the prime mover and connected with the said heating resistance for supplying current thereto, and means for varying the current supplied to said resistance whereby to regulate the heating effect thereof.

In testimony whereof I affix my signature.

ALBRECHT FRIEDRICH GEORG CARL
PAUL JOSEF von GROELING.